United States Patent Office 2,713,232
Patented July 19, 1955

2,713,232

PROCESS OF PRESERVING LIVE PLANTS

Glen Peterson, Tulsa, Okla.

No Drawing. Application November 21, 1949,
Serial No. 128,685

13 Claims. (Cl. 47—58)

This invention pertains to methods and processes of preserving live plants which have been momentarily removed from their natural habitat and which may be in the process of shipment, storage, or similar disposition.

It is a well-known fact that dead organic matter of which plants form one representative kingdom, and animals another, decompose rapidly under the normal environmental conditions which produced the growth of said materials; it is an equally well-known fact that such organic material can be preserved by heat sterilization and enclosure within an hermetically sealed vessel, by refrigeration, dehydration and through the use of chemicals. Such methods are not suited to the preservation of live plants and with the possible exception of refrigeration do not preserve dead organic matter in its natural state.

The primary object of this invention is to provide a method of maintaining the livelihood of plants which have been cut off from a normal supply of sunshine such as might occur during transportation from one place to another, or during a period of storage. Specifically, it is the purpose of this invention to provide in the most convenient form possible for the shipment of live plants from hot houses and nurseries for transplanting at points remote therefrom. In the most particular sense it is the purpose of this invention to provide live plants in sealed cans or similar containers. In this way distribution can be conveniently managed through the channels of commerce normal to similarly packaged goods.

Today, when many specialized plants, numerous varieties and hybrid forms are used for both ornamentation and providing food supplies, it is not always convenient for the small grower to begin with seeds. Too, there are many plant varieties having very small seeds from which the amateur gardener has difficulty in starting plants. Such problems, as well as those of the local florist, could be better handled by means of plants grown in large well-regulated hothouses and shipped to the consumer for transplanting. In other words, it is highly desirable to be able to store live plants, as we now store seeds.

The decomposition of plant and animal material is generally brought about by the activity of living organisms such as bacteria, yeasts and moulds. In some instances, it may be effected by certain enzymes as in animal stomachs, or it may be brought about by direct combustion, as by fire. Within the range of temperatures normally found on the earth today, very few (if any) animal and vegetable-produced substances decompose of their own accord; although it is true that organic compounds in general become unstable at elevated temperatures.

Decomposition brought about by living organisms, the action of chemicals and/or heat, or through combustion is ultimately and invariably a process of oxidation. There may be one or more intermediate steps in which complex hydrocarbons are broken up or transformed prior to oxidation, but the end product, once the cycle of destruction has completed, is without exception carbon dioxide ($CO_2$) and water ($H_2O$). The growth of plants, on the other hand, is a process of reducing $CO_2$ and $H_2O$ to form more or less complex carbohydrates and proteins. These reactions, as is well-known, take place in the presence of sunshine, the latter providing the necessary energy, and through the not-too-well understood action of plant chlorophyl, carotin and other catalytic and enzymic agents. Indeed, it seems that nature is engaged in a continuous cycle of plant growth and destruction—the reduction of $CO_2$ and $H_2O$ by plants, and the oxidation of the materials thus formed through the agencies of animals, living organisms, chemicals, heat and combustion. In this way, plants and animals continuously obtain from the sun the energy required for growth and other activities—in the case of animals, the energy of locomotion.

Experimentally, it has been demonstrated many times that both the growth and decomposition of organic tissue take place under rather restricted physical conditions. The natural combustion of each and every organic material requires a certain minimum concentration of oxygen in the atmosphere. For example, the atmosphere at sea-level contains by volume about 21% oxygen and readily supports the combustion of many materials. If this percentage of oxygen is reduced to about 17%, or less, many materials, of which a candle and a stick of wood are examples, will no longer burn. By the same token, many materials not combustible in the natural atmosphere become so when the percentage of oxygen is increased, and in pure oxygen most materials are combustible.

Similarly, the amount of free water in an organic substance (the wetness of the substance) determines how readily it will oxidize. If too little moisture is present, oxidation through the action of bacteria and chemicals will not take place—to wit, the preservation of foods by dehydration. On the other hand, if too much moisture is present, combustion will not occur—for example, wood will not burn if too wet.

Living organisms which, like fire, depend for a livelihood upon the oxidation of organic matter are likewise affected by a change in the percentage content of oxygen in the atmosphere, but it appears that within certain limits living organisms are more sensitive to the partial pressure of oxygen in the atmosphere about them than they are to the percentage content of oxygen; however, there is a rather close relationship between volumetric percentages of gases in a mixture and the partial pressures of these gases. In any event, it can be said that each and every organism requires oxygen from an external atmosphere in order to bring about the decomposition of organic material and there are limiting minimum percentage contents or partial pressures of oxygen in this atmosphere required to perpetuate the growth and multiplication of the organisms and thus promote the consequent decomposition of the organic material. These limiting partial pressures of decomposition are probably different for each and every organism and undoubtedly depend upon other physical conditions such as temperature and the amount of, or partial pressure of water vapor present.

While complete information is not available, it appears that plant growth depends, among other things, upon the percentage content and/or partial pressure of carbon dioxide ($CO_2$) in the surrounding air. If the carbon dioxide content is small, plant growth is slow, while if the carbon dioxide content is large, plant growth is rapid. These conditions apply only within certain limits, however—concentrations of $CO_2$ in the neighborhood of 0.1%.

It is observed that plant stems and roots possess the ability to store plant foods for considerable lengths of time. Such food stores are usually made in the form of proteins and other hydrocarbon complexes involving the replacement of one or more carbon atoms in the key positions of the hydrocarbon rings and chains by other elements such as nitrogen and some of the metals.

It is also observed that the buds of plants possess many of the qualities of reproduction that exist in seeds. In a manner of speaking, they carry the plant life through the winter climate when photosynthesis does not add to the plant food. When spring comes, new leaves, flowers and stems issue from the budded areas. Many plants will also produce roots from the bud areas when stems containing them are buried in the earth, or are treated with certain plant hormones. Again, it is in these areas that it is possible to graft new plant stems.

From these observations of nature alone, it is seen that within the stems and budded areas of plants there is a considerable storage of food, that plant life can be maintained for considerable periods without the addition of new food through photosynthesis. The primary problem, accordingly, is to prevent the existing food supplies within the plant stems and budded areas from deteriorating through the process of oxidation.

Considering these facts and hypothesis, it appears that a plant divorced from sunlight inside a sealed, opaque enclosure can be kept alive providing the oxygen content of the atmosphere in the enclosure is kept below the minimum required to sustain animal life and insure the multiplication of the organisms of plant decomposition; and providing, as a preferable embodiment of my invention, that the carbon dioxide content of the atmosphere inside the enclosure is slightly above the minimum which permits plant growth.

These are several embodiments of my invention whereby the oxygen content of the atmosphere inside the enclosure containing the plant can be reduced to a point insufficient to support microbe life. All of these methods include the use of an hermetically sealed vessel which contains the plant or vegetable matter being preserved. Such vessels can be formed of sheet metal, glass, treated paper and plastic substances and can assume a variety of forms, from rigid cylindrical structures to non-rigid plastic envelopes, as may be desired. They may or may not be opaque to light and other forms of radiation.

The first arrangement which I tried was that of evacuating the space inside the enclosure containing the plant. In view of the fact that the plant itself contains water, as also does the soil in which the plant is growing, it is difficult to obtain a very good vacuum inside the container; moreover, the soil in which the plant is growing also contains a considerable amount of gas of which oxygen is a component. Accordingly, simple evacuation does not much alter the partial pressures of the components forming the atmosphere and so does not greatly effect the ability of at least some of the fungi and bacteria to grow and destroy the plant.

The next expedient was to flush the enclosure in which the plant was placed, including the plant and soil in which it was growing, with carbon dioxide, for several hours and then evacuate or partially evacuate the space before sealing. This was fairly successful providing the $CO_2$ was dry and the ground in which the plant was growing was also fairly dry. But sealing the plant inside an atmosphere of carbon dioxide, at atmospheric pressure after an hour or two of flushing seemed to be equally successful. Plants thus sealed would live for a week or more; whereas, control plants sealed in ordinary air with no flushing or moisture control would be irreparably damaged within two or three days. These experiments were all carried out in the summer time with relatively high temperatures prevailing. Microbic plant destruction is, of course, much lower when the ambient temperatures are low.

In my third experiment I flushed the plant, soil and enclosure with carbon dioxide, as before, but placed a small amount of silica gel inside the enclosure prior to sealing to take up the water vapor that would be given off. This plant was sealed at atmospheric pressure. I also went to more pains in the growth of this plant prior to canning than with those previously used. For several weeks I subjected it to partial drouth and also severely pruned it several times. My theory was such treatment would cause the stem to build up a greater supply of plant food. Just before placing it inside the container, I removed all the foliage except one small leaf which was just beginning to appear in a budded area.

This plant I kept bottled up for seven days, all the while the foliage just appearing at the budded area when it was canned, grew profusely until it nearly filled the quart container. The only light which this plant received was from a hundred watt incandescent lamp during a ten minute observation period each night.

When removed from the bottle, at the end of a seven day period and transplanted to regular graden soil, this plant never stopped growing, nor did it show any signs of having suffered from the treatment which it received. Plants previously canned (no more than three days) without benefits of the special treatment, never survived exposure to the sunlight.

While experimental tests have not yet been made, it is believed that canning of the plants in an atmosphere of inert gases, such as nitrogen or argon, in which a small quantity of carbon dioxide is present, and from which most of the water vapor has been removed, would serve equally as well as an atmosphere of nearly pure carbon dioxide.

At this point, it might be well to point out that temperature control should also be conducive to the production of stored energy fuels in plants. Observation of nature would lead one to suspect that this might be the case. But so far I have not exprimented with this factor, although it is on my program. Again, the use of certain chemicals could greatly expedite the storage of complex plant foods from which new foliage can grow.

My experiments have thus far shown that for best results the amount of water vapor in the atmosphere about the plant being preserved should be kept below a certain minimum. In some of my experiments and as already noted, this was accomplished by putting a small amount of silica gel inside the enclosure containing the plant. Other dehydrating agents can of course be used. My theory is that the lowering of the humidity inside the container does two things: First, it greatly reduces the amount of carbonic acid that is formed and so decreases the destruction of plant foliage through this medium; second, it inhibits the growth of moulds, etc., which tend to attack the plant stems and foliage in the absence of sunlight.

Studies were also made in the preservation of cut flowers and vegetable matter. Attempts were also made to preserve plants from which all soil had been removed so as to eliminate unnecessary weight and as much as possible of the material from which contamination could come. To date these experiments have not been too successful due largely to the difficulty of preventing the roots from drying out during the flushing process required to remove all the oxygen. Once this problem can be satisfactorily solved, as by protecting the roots with a slightly moist pad during the flushing operation, it is believed that live plants can be preserved divorced from all soil. This would provide the most economical means of packaging such goods as a large number of such plants could be stored within a single container.

While the experiments which I have thus far conducted, using exceptionally crude apparatus, have not been quantitatively perfect, nevertheless, the qualitative results obtained are unmistakable. From these experiments, observation of nature, together with a study of available literature, I conclude that:

1. The preservation of live plants divorced from all sunlight for considerable periods of time is possible;
2. The amount of bacteriological putrefaction is governed by the oxygen supply—that if essentially no oxygen is present, no mould forms on the plants, nor is there present any of the musty smell that accompanies the formation of moulds and other forms of putrefaction;
3. That the plants and water within them, or the water in the soil, as well as the soil itself, have occluded oxygen which must be rather completely removed to perfect the state of preservation;
4. That the sustenance of plant growth helps preserve the plant against putrefaction; the balance between life and death of a plant in the absence of some growth is difficult to achieve;
5. That energy may be taken from old stems or twigs to feed a new budding stem;
6. That the rate of growth of a newly budded plant stem in a high concentration of carbon dioxide is rapid, provided there is a sufficient store of energy available in old stems and roots;
7. That the color of a newly budded stem growing on an old stem in the absence of light, including the foliage, is nearly the same as that of such a stem growing in sunlight;
8. That such a stem does not deteriorate when placed in the sunlight but continues to grow;
9. That the rate of growth which takes place, or can be permitted, depends upon the energy that has been stored in the plant, the concentration of carbon dioxide in the enclosing atmosphere, and the storage time interval;
10. That the amount of water vapor in the enclosed atmosphere must be kept at a minimum, while the plant roots must be kept moist;
11. That other forms of vegetable decomposition, than those caused by bacteria, must be considered if the plant is to be preserved, i. e., those caused by enzymes, etc., contained within the plant itself.

The very enzymes needed for the reduction of $CO_2$ and $H_2O$ in the process of photosynthesis are very probably the same ones, or closely allied thereto, that are required for the oxidation and consequent destruction of the plant. At least the enzymes required for plant digestion or putrefaction are present within the plant. Obviously, these enzymes cannot be removed from the plant without destruction of that which is being preserved—namely, the plant life. Accordingly, the preservation of plant life can best be accomplished by controlling the action of the enzymes present such as directing them toward a small plant growth, that is to say the processes which reconvert stored plant food into growing plant tissue.

In the preferred form of my invention, I grow my plants in small pots until they reach a size suited to the canning operation. I then let these plants go several days without watering, until the soil in which they are growing is fairly dry. After this I remove most of the foliage being careful not to destroy the budded areas on the stems where new growth issues. I may or may not prune the plant stems, depending upon their size and condition of growth. I next place the plants in a flushing vessel where a continuous stream of dry nitrogen and/or carbon dioxide is passed over them and through the soil in which they are growing. Following this treatment, I place the individual plants in cans of appropriate size and shape, again flushing this volume with a mixture of dry nitrogen and $CO_2$, place a small amount of silica gel inside the can, preferably on top the soil in which the plant is growing, and then seal at atmospheric pressure.

The proportion of nitrogen to $CO_2$ in the atmosphere of the sealed can is based upon the quantity of $CO_2$ that may be required for a small but sustained growth of new foliage from the plant stem. When individual plants are sealed in very small cans, nearly pure $CO_2$ is used; when larger containers are used as when a dozen or more plants are sealed in a larger can, then the proportion of $CO_2$ can be less.

The amount of silica gel used, on the other hand, is gauged to keep the humidity of the atmosphere in the can low—of the order of a few per cent.

In view of the fact that the process of photosynthesis, and plant growth through other energetic means, reduces water and carbon dioxide and releases oxygen it is sometimes necessary to provide a means within the sealed container of removing this oxygen from the atmosphere of the plant. This can be done in one or more of several ways: providing an absorbing body such as silica gel or powdered carbon; or providing oxygen absorbing substances such as iron or magnesium filings, or a film getter of rare earth metals on the walls of the vessel.

There are a number of plants which will reproduce themselves from stems or cuttings. At the same time many of these plants are annuals and will perish during a cold winter. This invention is useful in preserving such plants from one year to the next by means of plant stems or cuttings. The stems to be preserved are carefully selected to have a number of budded areas, to be free from disease and are taken from the sturdy, tough portions of the plant wherein a considerable amount of plant food may be stored. All foliage is removed and the stems washed and treated with a mild solution of suitable antiseptic, such as cupric oxide, or Semisan. The stems are then washed in distilled water and dried in the sun or under a fungicidal lamp. After this treatment, the stems are flushed in a container through which a continuous stream of dry nitrogen and/or carbon dioxide passes. They are then placed in suitable metallic containers and sealed with an atmosphere of N and $CO_2$ about them, all oxygen having been removed; or they may be placed inside plastic envelopes or bags and sealed within an atmosphere of N and $CO_2$. A small amount of silica gel may also be placed inside these containers to take up the free moisture.

When the planting season arrives, these stems are removed from their containers and a portion of each placed in the soil, preferably with three or more budded areas below the soil and at least two budded areas above the soil. In some instances, these plants may be treated with plant hormones, tending to induce root and foliage growth, before being planted. A number of such plant hormones are now on the market.

Especially is this method of plant preservation suited to hybrid forms of decorative plants and garden vegetables. Seeds for such plants are often difficult to grow and so are very expensive and often it is equally difficult to raise very many good plants from this expensive seed, as the germination ratio is not always high. Raising hybrid plants from a continuous succession of hybrid stems avoids this problem and at the same time provides a much quicker and more reliable plant start than can be obtained from seeds.

In addition to the foregoing preferred means of preserving live plants within sealed containers divorced from sunlight, I also propose making available to the plant a small store of radiant energy through the combined agencies of radioactivity and fluorescence. The energy required by a small plant growth can be provided by including within the enclosure, containing the plant, a very minute quantity of a naturally radioactive material, or of an artificially-produced radioactive isotope. This radioactive energy can be reduced to the form which can be assimilated by plants by means of fluorescent materials, such as zinc sulfide, mixed intimately with the radioactive material and painted in a very thin layer on the inner surfaces of the container.

The quantity of such radioactive material as may be required would be small enough as to not be dangerous to human life. Too, those isotopes having a single radioactive transformation of moderate half-life before being transformed into a stable element could be selected. In this way the dangers of cumulative contamination could be avoided.

Isotapes having α-particle transformations only would be the most suited to this application, as α-rayers produce a much greater fluorescence than do β-rayers, although both types could be used. Those radioactive materials giving rise to energetic gamma rays, or having very long lives, should be avoided in this application of atomic energy. Both α- and β-rays can be stopped by very thin layers of solid matter so that if the radioactive material is placed inside the plant container, these rays could be prevented from escaping. The same is not true of γ-rays—especially the energetic ones. They will penetrate considerable thicknesses of solid matter and thus present a continuous hazard to personnel working with these materials, as well as promoting the destruction of the plant. α- and β-rays may also destroy the plant if adequate provisions are not taken. Such destruction can generally be avoided: first, by selecting weak radiators (low energy particles); second, by using minute quantities of these substances; third, by using a layer of fluorescent material between the radioactive material and the plant sufficient to absorb most of the radiation. In the preferred form of this invention, each particle of the radioactive material is coated with a layer of fluorescent material of appropriate thickness.

As previously indicated, the balance between life and death of a plant may be obtained by a minute plant growth; hence, only a very small energy is required. This energy may be obtained internally from organic materials previously stored in the plant; or externally, through the combined agencies of radioactivity and fluorescence.

I claim:

1. The method of providing for the shipment and storage of live plants comprising sealing said plants inside a container which is impervious to all fluids including water vapor, and providing within the enclosed space a store of available plant food and radioactive and fluorescent materials in quantities harmless to the plants but sufficient to produce light, and an atmosphere consisting of inert gases, carbon dioxide, and a slight amount of water vapor.

2. The method of providing for the shipment and storage of live plants, as in claim 1, said radioactive and fluorescent materials being intimately mixed together and coated in a thin layer on the walls of said container which are exposed to said plants.

3. The method of providing for the shipment and storage of live plants, as in claim 1, said radioactive materials being rich in alpha- and beta-ray emission and weak in gamma-ray emission.

4. The method of providing for the shipment and storage of live plants, as in claim 1, said fluorescent materials producing light primarily within the visible spectrum.

5. The method of providing for the shipment and storage of live plants, as in claim 1, said fluorescent materials being rich in the emission of orange and blue light.

6. The method of providing for the shipment and storage of live plants, as in claim 1, said fluorescent materials completely enclosing each particle of said radioactive materials and providing a barrier between said radioactive materials and said plants.

7. The method of providing for the shipment and storage of live plants, as in claim 1, said radioactive materials being radioactive isotopes, said radioactive isotopes transforming into stable isotopes in single transformations.

8. The method of providing for the shipment and storage of live plants, as in claim 1, said radioactive materials having half-lives greater than ten but less than three hundred days.

9. The method of providing for the shipment and storage of live plants, as in claim 1, said contents of said container including said plants, said plant food and said radioactive and fluorescent materials being treated to remove all oxygen prior to sealing inside said container, said treatment consisting of flushing said contents in a stream of inert gases and providing within the container oxygen absorbing substances.

10. The method of providing for the shipment and storage of live plants, as in claim 1, said water vapor within said container being controlled by providing a desiccant within said container.

11. The method of providing for the shipment and storage of live plants, as in claim 1, said store of available plant food consisting in part of chemical substances within the stems, roots and foliage of said plants.

12. The method of providing for the shipment and storage of live plants, as in claim 1, said store of available plant food consisting in part of chemical substances within the stems, roots and foliage of said plants, said chemical substances having been caused to particularly accumulate in said plants by means of a special treatment prior to sealing said plants in said container, said treatment consisting of the steps of repeatedly pruning said plants and alternately subjecting them to drought and moisture cycles.

13. The method of providing for the shipment and storage of live plants, as in claim 1, said store of available plant food consisting in part of chemical substances within the stems, roots and foliage of said plants, said chemical substances having been caused to accumulate in said plants by means of a special treatment prior to sealing said plants in said container, said treatment consisting of the steps of repeatedly pruning said plants and alternately subjecting them to hot and cold cycles.

References Cited in the file of this patent

UNITED STATES PATENTS

| | | |
|---|---|---|
| 891,176 | Von der Kammer | June 16, 1908 |
| 1,532,831 | Mastin | Apr. 7, 1925 |
| 1,770,379 | Young | July 15, 1930 |
| 1,910,806 | Milani | May 23, 1933 |
| 1,950,701 | Spangenberg | Mar. 13, 1934 |
| 1,988,886 | Wilson | Jan. 22, 1935 |
| 1,998,238 | Howeth | Apr. 16, 1935 |
| 2,040,161 | Widmann | May 12, 1936 |
| 2,222,225 | Green | Nov. 19, 1940 |
| 2,300,776 | Collins | Nov. 3, 1942 |
| 2,353,029 | Graham | July 4, 1944 |

FOREIGN PATENTS

| | | |
|---|---|---|
| 24,939 | Australia | of 1935 |
| 462,193 | France | Nov. 17, 1913 |
| 818,712 | France | June 21, 1937 |

OTHER REFERENCES

The New Garden Encyclopedia, published 1941 by Wm. H. Wise & Co., N. Y., pp. 611, 1240, 1241, articles on Hardening-off and Transplanting.